(12) United States Patent
Finn

(10) Patent No.: US 12,489,714 B2
(45) Date of Patent: Dec. 2, 2025

(54) CYCLIC QUEUING AND FORWARDING (CQF) SEGMENTATION

(71) Applicant: Huawei Technologies Co., Ltd., Shenzhen (CN)

(72) Inventor: Norman Finn, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 340 days.

(21) Appl. No.: 18/336,897

(22) Filed: Jun. 16, 2023

(65) Prior Publication Data

US 2023/0328002 A1 Oct. 12, 2023

Related U.S. Application Data

(63) Continuation of application No. PCT/US2020/065302, filed on Dec. 16, 2020.

(51) Int. Cl.
*H04L 47/62* (2022.01)
*H04J 3/06* (2006.01)
*H04L 47/24* (2022.01)
*H04L 47/6295* (2022.01)

(52) U.S. Cl.
CPC .......... *H04L 47/622* (2013.01); *H04J 3/0658* (2013.01); *H04L 47/24* (2013.01); *H04L 47/6295* (2013.01)

(58) Field of Classification Search
CPC ... H04L 47/622; H04L 47/6215; H04L 47/20; H04L 47/24; H04L 47/6295; H04L 12/4625; H04L 47/22; H04L 49/206; H04L 49/9036; H04L 49/9057; H04J 3/06; H04J 3/0658; H04J 3/0661; H04J 3/0697
See application file for complete search history.

(56) References Cited

U.S. PATENT DOCUMENTS

| 2017/0280357 A1* | 9/2017 | Finn | H04L 49/9005 |
| 2020/0213022 A1* | 7/2020 | Götz | H04J 3/0697 |
| 2020/0382422 A1* | 12/2020 | Akakura | H04L 45/74 |

OTHER PUBLICATIONS

N. Finn, et al., "DetNet Bounded Latency," draft-finn-detnet-bounded-latency-03, Mar. 11, 2019, 32 pages.
Yan Jinli, et al., "Injection Time Planning: Making CQF Practical in Time-Sensitive Networking," IEEE Infocom 2020—IEEE Conference on Computer Communications, Jul. 6, 2020, XP033806572, pp. 616-625.

(Continued)

*Primary Examiner* — Mohamed A Kamara
(74) *Attorney, Agent, or Firm* — Conley Rose, P.C.

(57) ABSTRACT

A method for communicating time sensitive data streams in a network. The method includes synchronizing queuing and transmission of data in a set of output buffers for buffering streams associated with a certain class of service. The method includes processing data packets of a stream using a cyclic flow meter, wherein the cyclic flow meter limits transfer of the data packets of the stream to the set of output buffers of the network node according to a predetermined amount per cycle based on an output frequency. The method includes transmitting, according to the output frequency, the data packets of the stream from a non-empty output buffer of the set of output buffers, and transferring the data packets of the stream from the cyclic flow meter to an empty output buffer of the set of output buffers.

20 Claims, 6 Drawing Sheets

(56) References Cited

OTHER PUBLICATIONS

Finn Norman, et al., "Time-Sensitive Networking Horizons Possibilities for Achieving Bounded Low Latency," Jan. 25, 2020, XP05583993, 23 pages.

Mick Seaman, "Paternoster policing and scheduling," Revision 2.1, May 8, 2019, 10 pages.

\* cited by examiner

CYCLIC QUEUING AND FORWARDING (CQF) SEGMENTATION

CROSS-REFERENCE TO RELATED APPLICATIONS

This application is a continuation of International Patent Application No. PCT/US2020/065302 filed on Dec. 16, 2020, by Futurewei Technologies, Inc., and titled "Cyclic Queuing and Forwarding (CQF) Segmentation," which is incorporated by reference in its entirety.

TECHNICAL FIELD

The present disclosure is generally related to time sensitive networking, and more particularly to a systems and methods for cyclic queuing and forwarding (CQF) segmentation.

BACKGROUND

Standard network equipment has no concept of "time" and cannot provide synchronization and precision timing. Generally, delivering data reliably is more important than delivering within a specific time, so there are no constraints on delay or synchronization precision. Even if the average hop delay is very low, individual delays can be unacceptably high. Network congestion is handled by throttling and retransmitting dropped packets at the transport layer, but there are no means to prevent congestion at the link layer. Data can be lost when the buffers are too small or the bandwidth is insufficient, but excessive buffering adds to the delay, which is unacceptable when low deterministic delays are required.

Time-Sensitive Networking (TSN) is a set of standards under development by the Time-Sensitive Networking task group of the Institute of Electrical and Electronics Engineers (IEEE) 802.1 working group. Most projects define extensions to the IEEE 802.1Q—Bridges and Bridged Networks, which describes Virtual LANs and network switches. These extensions in particular address the transmission of very low transmission latency and high availability. Applications include converged networks with real-time Audio/Video streaming and real-time control streams which are used in automotive or industrial control facilities.

SUMMARY

Disclosed herein are various systems and methods for communicating data for a particular class of service (i.e., for time-sensitive streams) that meets the goals of TSN (i.e., no packets are ever lost because of congestion and, for each stream, there is a finite worst-case delivery time that is never exceeded) while resolving one or more issues related to current queuing and transmission standards.

A first aspect relates to a method for a method implemented by a network node for communicating time sensitive data streams in a network. The method includes configuring a set of output buffers associated with an output port of the network node for exclusive use in buffering streams associated with a certain class of service. The method includes synchronizing the queuing and transmission of data in the set of output buffers according to an output frequency. The set of output buffers of all network nodes in a region of the network is synchronized to the output frequency. The method includes receiving data packets of a stream associated with the certain class of service. The method includes processing the data packets of the stream using a cyclic flow meter. The cyclic flow meter limits transfer of the data packets of the stream to the set of output buffers of the network node according to a predetermined amount per cycle based on the output frequency. The method includes transmitting, according to the output frequency, the data packets of the stream from a non-empty output buffer of the set of output buffers, and transferring the data packets of the stream from the cyclic flow meter to an empty output buffer of the set of output buffers.

Optionally, in a first implementation according to the first aspect, the set of output buffers includes a predetermined amount of buffer space to store data packets associated with the certain class of service for a certain time period to ensure that no data packets associated with the certain class of service is dropped due to congestion.

Optionally, in a second implementation according to the first aspect or any preceding implementation of the first aspect, the certain class of service guarantees a not-to-exceed delivery time for a predetermined maximum packet size and a predetermined maximum transmission rate.

Optionally, in a third implementation according to the first aspect or any preceding implementation of the first aspect, synchronizing the queuing and transmission of data in the set of output buffers is implemented according to a cyclic queuing and forwarding (CQF) standardized algorithm, and all network nodes in a region implements the CQF standardized algorithm for synchronizing the queuing and transmission of data.

Optionally, in a fourth implementation according to the first aspect or any preceding implementation of the first aspect, the data packets of the stream is received from a second network node that is external to the region of the network node.

Optionally, in a fifth implementation according to the first aspect or any preceding implementation of the first aspect, the method includes unbundling a bundle that includes the stream.

Optionally, in a sixth implementation according to the first aspect or any preceding implementation of the first aspect, the method includes bundling the stream with at least one other stream into a bundle.

Optionally, in a seventh implementation according to the first aspect or any preceding implementation of the first aspect, the cyclic flow meter implements a paternoster forwarding algorithm.

A second aspect relates to a network node that includes memory that stores instructions, and one or more processors in communication with the memory, the one or more processors is configured to execute the instructions to cause the network node to perform any of the preceding implementation of the first aspect.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
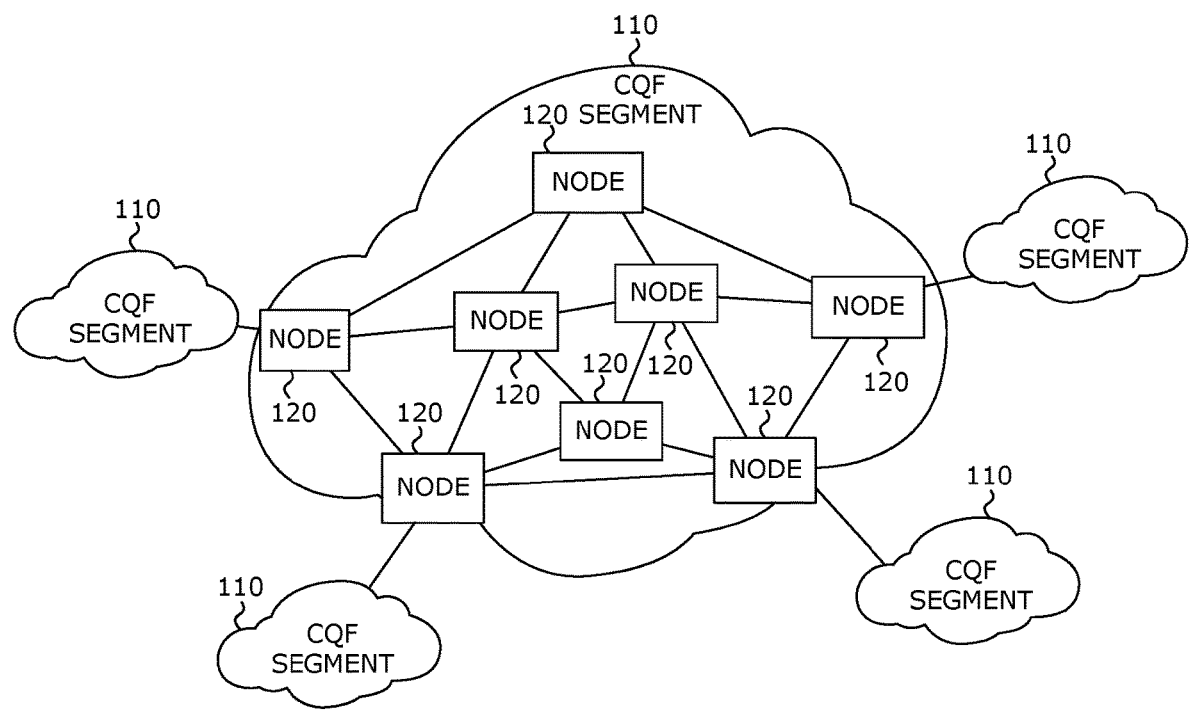
FIG. 1 is a diagram illustrating an example of a network in accordance with an embodiment of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The Time-Sensitive Networking Task Group is responsible for standardizing techniques for resource reservation and queueing so that, in a network of IEEE 802.1Q bridges and end stations, the end stations can transmit time-sensitive streams of data. The goal is to transmit time-sensitive streams such that 1) no packets are ever lost because of congestion, e.g., the packet encounters a full output buffer and is dropped for lack of a place to store it; and 2) for each stream, there is a finite worst-case delivery time that is never exceeded. Streams can be unicast (one Source, one Destination) or multicast (one Source, one or more Destinations).

Several queuing techniques have been standardized by IEEE 802.1 to accomplish the above stated goal. All require that, before transmission of a stream, a reservation is established for the stream. This reservation is a contract between the Talker/Source (or its proxy) and the network. The Talker states the essential characteristics of the stream, which include, at least, a maximum packet size and a maximum transmission rate. The network and Talker can then compute and/or negotiate a not-to-exceed delivery time. The network then reserves resources and dedicates them to the stream (or sometimes, to a class of streams). At that point, the Talker can transmit the stream with full confidence that every packet will reach its destination within the promised delivery time.

Cyclic Queuing and Forwarding (CQF), also known as the Peristaltic Shaper (PS), and paternoster are two of the queuing and transmission techniques standardized by and/or discussed in IEEE 802.1. 802.1Q-2018 Annex T describes an elementary form of CQF. Other more capable forms of CQF have also been advanced such as Multiple CQF and CQF for Latency Matching. In Multiple CQF, a third buffer may be required if the link delay from one network node to the next is not very close to an integral multiple of T. For CQF Latency Matching, more than three buffers can be used in order to deliberately delay a stream. In general, the basic idea of CQF is that, at each intermediate port along the path of the stream through the network, the network node has a pair (in basic CQF) or more (in the more capable forms) buffers, each large enough to hold all of the critical stream data for a particular class of streams for a certain time period T. All the network nodes in a network run clocks that are syntonized to an accuracy much smaller than the time T, and all the nodes switch output buffers for a given class at the same moment throughout the network. "Syntonized," here, means "operating at the same frequency." Thus, the network node chooses the buffer in which to place a received packet based purely on the time of reception of the packet. Over the long term, the difference between the perceived time in the various devices is bounded within a small range (in this case, much smaller than T). The result is that packets advance by one buffer each tick of the clock. Each packet takes an integral number of clock ticks (as few as 1), to make each hop along the path through the network. The worst-case end-to-end delay can be easily calculated. Congestion can never occur, because the resource reservation process never grants permission for more stream data to pass through a given port than its buffer can transmit in one T clock period. The attraction of this scheme is that no per-stream state is required in the network nodes. A central engine can track the network reservations, and grant a stream permission to flow without consulting any network nodes, and without explicitly altering any resource allocation in any network node.

The use of CQF presents several issues. The first problem is that CQF requires that all the network nodes in the network be syntonized, and drive their buffer queuing mechanism by this syntonized clock. As the network grows, this becomes more and more difficult to achieve, to the point that it becomes impractical. The second problem is that CQF requires that the same time constant T be used at every hop along the path of a stream. As a network grows, the speeds of the links are different in different parts of the network, making the choice of T difficult because no one choice satisfies all parts of the network. The third problem is that CQF requires that every stream reserve at least one packet in every clock tick T. In the central parts of the network, where many thousands of streams pass through a single (very high speed) link, the time constant T has to grow accordingly, which means that the per-hop transmission time becomes very large. This both slows down the streams and increases the buffer capacity required.

Like CQF, paternoster uses a limited number of buffers that switch using the same time constant T throughout the network. For paternoster, any number of buffers may be employed. The number chosen for paternoster is (at least) the smallest number that can accommodate the worst-case burst of data for any stream passing through that set of buffers. Again, more can be used to deliberately delay a stream. Using either CQF or paternoster, no stream will have more data transmitted during one period T than is allowed by its reservation. However, paternoster differs from CQF in that instead of syntonizing all the network nodes as required with CQF, paternoster uses a shaper for each stream at each hop that meters the packets of that stream into the buffers such that no more than a certain number of bytes is placed into any one buffer from any one stream. The number of bytes is calculated from the original reservation parameters for the stream. This ensures that the buffers are never overfilled. Thus, if a packet arrives early, it can be assigned to a buffer that will be transmitted later. A bit of overprovisioning ensures that small differences in clock frequency from network node to network node will not result in a buffer overflow. Thus, paternoster supplies essentially the same service as CQF. The benefit of paternoster is that the network nodes' clocks do not have to be syntonized, which alleviates at least one of the above issues associated with CQF. The disadvantage of paternoster is that a shaper must be provisioned at every hop for every stream.

The present disclosure provides various systems and methods for communicating data for a particular class of service (i.e., for time-sensitive streams) that meets the goals of TSN (i.e., no packets are ever lost because of congestion and, for each stream, there is a finite worst-case delivery time that is never exceeded). In an embodiment, a method and network node are provided that optimizes resources in a network for handling time sensitive data streams while addressing the above issues related to CQF and paternoster.

FIG. 1 is a diagram illustrating an example of a network in accordance with an embodiment of the present disclosure. As stated above, CQF presents several issues as the network grows. To address these issues, the disclosed embodiments divide the network into multiple regions 110 as illustrated in FIG. 1. Each region 110 comprises two or more network nodes 120 that are directly or indirectly communicatively linked. The network nodes 120 can be any type of network device such as, but not limited to, network bridges, switches, servers, routers, and end stations. Each of the network nodes 120 within a region 110 implements the same queuing and transmission technique. For example, in an embodiment, each of the network nodes 120 within a region 110 is configured to implement CQF, which means that every output port that is connected to an input port that is in the same CQF segment utilizes the CQF algorithm. The buffer swapping on all of these ports is syntonized on all network nodes in the CQF segment (i.e., the phase relationships among the various network node's ports buffer swaps is constant) with the same buffer-swap period. These regions are referred to herein as CQF segments as shown in FIG. 1. As stated above, using CQF, each network node 120 reserves at least a pair of output buffers on a given port for the exclusive use of streams that belong to a particular class of service, each buffer large enough to hold all the critical stream data for the particular class of streams for a certain time period T. In an embodiment, there may be other classes of service in that network, or even on that same port of a network node 120 that have their own resources such as buffers, and they may employ CQF, paternoster, or other queuing and transmission techniques. By dividing the network into separate CQF segments, the disclosed embodiments limit the number of network nodes 120 that are required to be syntonized, which drives their buffer queuing mechanism, to just the number of network nodes in a CQF segment. Each CQF segment can operate on a different syntonized clock meaning any output port outside a CQF segment that is transmitting packets to an input port of a network node 120 in the CQF segment may not be syntonized with the CQF segment.

However, because each CQF segment can operate on a different syntonized clock, the disclosed embodiments employ a cyclic flow meter, such as, but not limited to, a paternoster shaper to admit each stream into a CQF segment. The cyclic flow meter prevents overflow of the CQF buffers, and allows the stream to use different values of T in the two segments (i.e., between a sending CQF segment and a receiving CQF segment). Thus, the cyclic flow meter makes network segmentation possible, while still maintaining the TSN goals.

By dividing the network into CQF segments, each of which requires syntonization, the disclosed embodiments address the problem of the size of the syntonized network. The problem of excessive per-stream per-network node state has been improved within each CQF segment, except at the edges where the streams enter the CQF segment. At the edges, as described above, the streams must be conditioned using a paternoster shaper for each one, but for the rest of the stream's journey through the CQF segment, no further shapers need be configured. If a stream passes through a chain of CQF segments, it only needs one paternoster shaper per transition between CQF segments.

In addition, the disclosed embodiments can employ bundling on links that have large number of streams to address two of the drawbacks discussed above related to CQF (the issue with requiring a large size of T required for CQF to handle many streams) and Paternoster (the issue with requiring a large number of per-stream shapers required for paternoster to handle many streams). Bundling means combining some number of streams into a single aggregate stream that can be treated as a single stream for the purposes of meeting the congestion and delay goals of TSN. This must be done in such a manner that the component streams can not only be combined into bundles, but be separated at some point (unbundled), to continue their progress individually. For example, in an embodiment, at an input port of a network node 120, any bundles that are to be separated into component streams are first separated. If any of those component streams are to be rebundled back together (in the same or different combinations) then they are rebundled. The packets of each resultant stream (which may be a bundle) is assigned to an output buffer using a separate paternoster shaper. In an embodiment, after rebundling, one paternoster shaper is used for each component stream of the new bundle, rather than one paternoster shaper for the whole bundle. In certain embodiments, the cyclic flow meter or paternoster shaper can be employed for each stream as it is separated out from a bundle because a stream in a bundle has, by design, lost the fine-grained control that minimizes the number of buffers at each hop required to service that stream.

In certain embodiments, bundles of bundles can also be useful. Various known bundling techniques include mac-in-mac bundling (clause 6.13 of IEEE Std 802.1Q-2018) or Multi-Protocol Label Switching (MPLS) described in Internet Engineering Task Force (IETF) Requests for Comment (RFC) 3031. The bandwidth required for a bundle of streams is the sum of the bandwidth of the component streams, and the maximum packet size is the maximum over the component streams.

Figure 2:
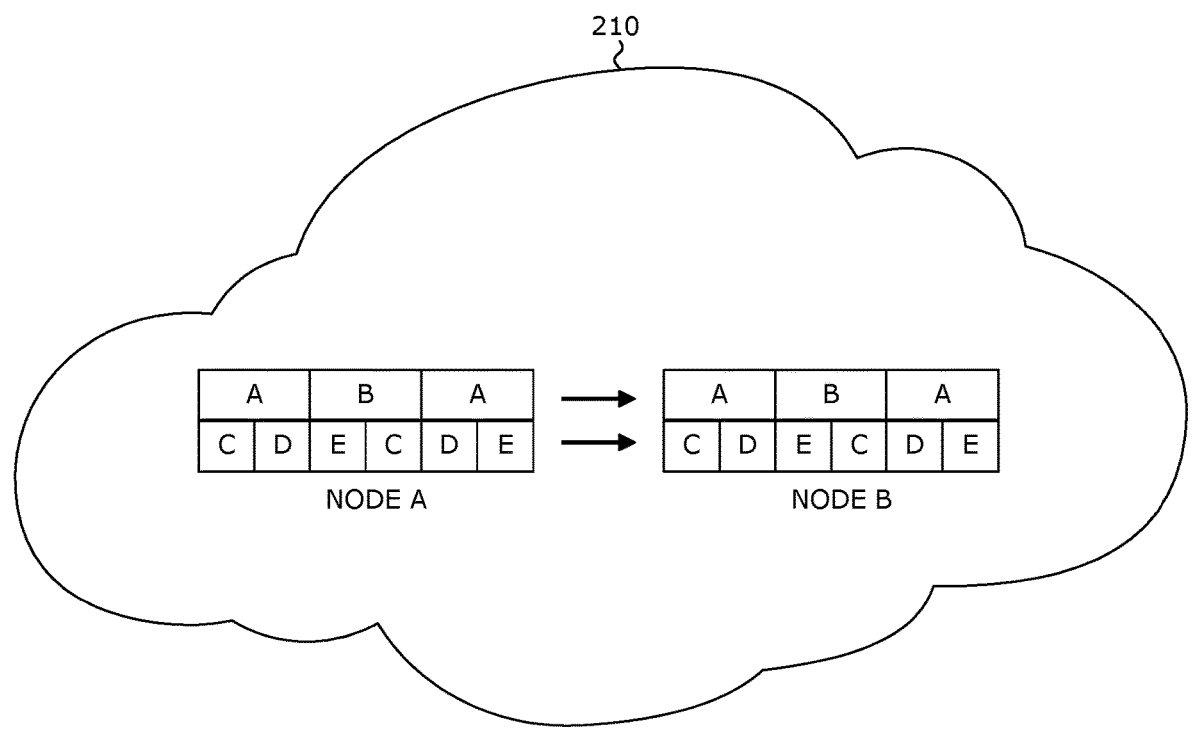
FIG. 2 illustrates the output buffers of two network nodes within a CQF region according to an embodiment of the present disclosure.

FIG. 2 illustrates the output buffers of two network nodes within a CQF region according to an embodiment of the present disclosure. In the depicted embodiment, Node A and Node B are in the same CQF region 210. As described above, within the CQF region 210, data packets are assigned to an output buffer based on service class and time of arrival. Since nodes A and B are frequency locked, packets proceed in-step and cannot experience congestion. Both node A and node B include 2 output buffers, buffer A and buffer B of the same size. In the depicted embodiment, there are three time-sensitive streams (streams C, D, and E) that are associated with the service class for which buffer A and buffer B are reserved for exclusive use. Each buffer can hold two streams. CQF outputs data in a very regular pattern and it requires the data come in a very regular pattern. CQF conditions it into that regular pattern. As described above, the output buffers for the network nodes within a CQF segment are syntonized to clock, and the output buffer is swapped every clock tick. Thus, the network nodes 120 continuously swap between buffer A and buffer B for streams C, D, and E. For instance, during the first clock cycle, arriving streams C and D are transferred to output buffer A of node A. At the next clock cycle, the output buffers are swapped, and arriving streams E and C are transferred to output buffer B of node A, while streams C and D from output buffer A of node A are transmitted to node B, where they are placed in output buffer A of node B. At the next clock cycle, the output buffers are swapped, and arriving streams D and E are transferred to output buffer A of node A, while streams E and C from output buffer B of node A are transmitted to node B, where they are placed in output buffer B of node B. This process is repeated at each of the nodes in the CQF segment.

Figure 3:
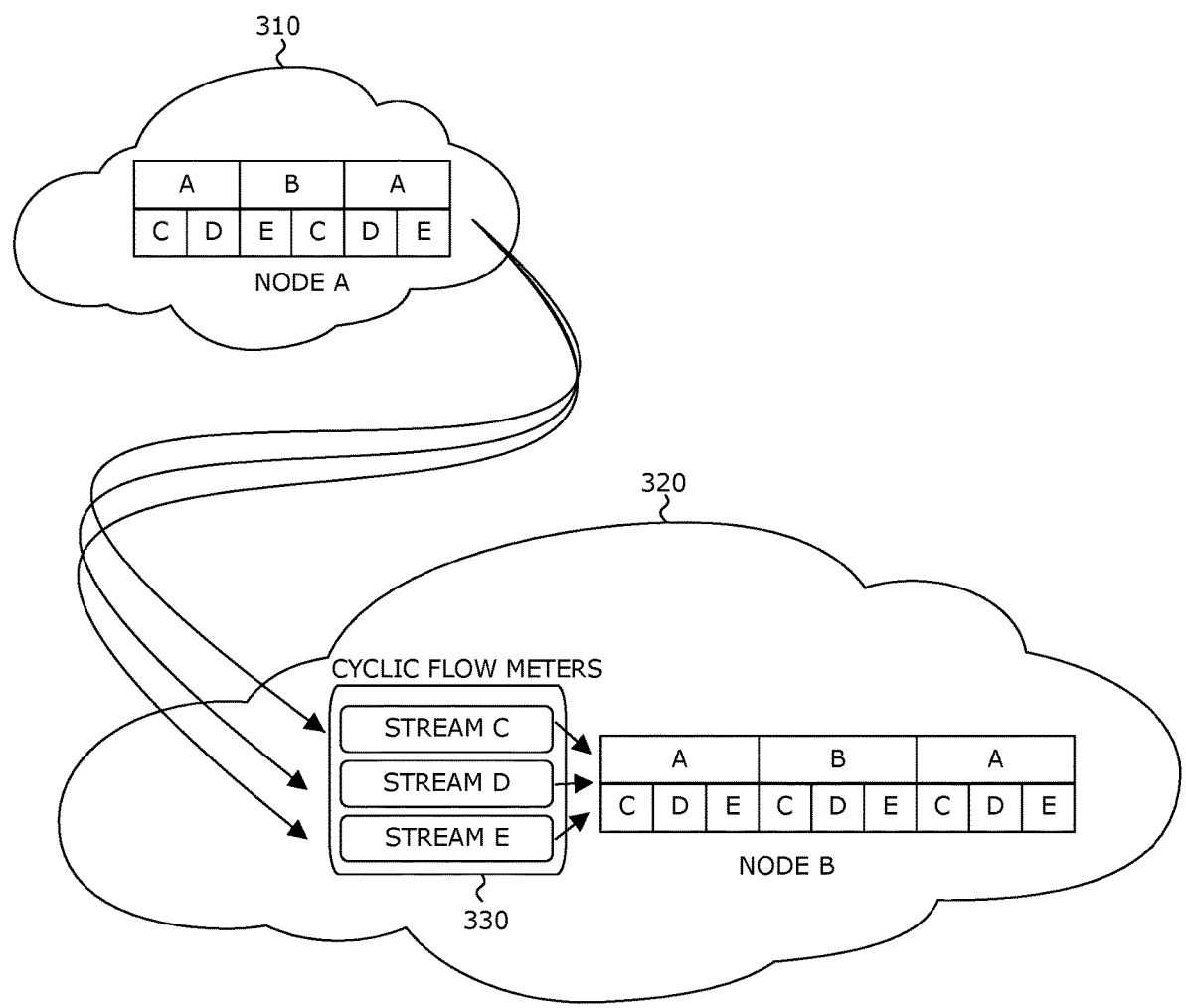
FIG. 3 illustrates the output buffers of two network nodes that are in different CQF regions according to an embodiment of the present disclosure.

FIG. 3 illustrates the output buffers of two network nodes that are in different CQF regions according to an embodiment of the present disclosure. In the depicted embodiment, node A has a two output buffers, buffer A and buffer B, that are reserved for exclusive use of transmitting streams of a particular class of service (e.g., streams C, D, and E). Node A is in a first CQF region 310. Node A is configured to output the time sensitive streams C, D, and E to Node B. Node B is in a second CQF region 320. Node B also has a two output buffers, buffer A and buffer B, that are reserved for the exclusive use of transmitting streams C, D, and E. However, in the depicted embodiment, buffer A and buffer B of Node B are bigger and operate at a different frequency than buffer A and buffer B of Node A. Thus, in accordance with the disclosed embodiments, the data from each of the 3 streams are put through a cyclic flow meter 330 to ensure that buffer A and buffer B on node B do not overflow. In an embodiment, a different cyclic flow meter 330 is used for each stream (i.e., per-stream metering). The cyclic flow meter 330 utilizes one or more queues or buffers for temporarily holding the stream data. The cyclic flow meter 330 is configured to release the stream data from the one or more queues or buffers at a predetermined rate based on the new cycle frequency of node B. In an embodiment, the cyclic flow meter 330 implements the queuing and forwarding using a paternoster forwarding algorithm. In other embodiments, the cyclic flow meter 330 can be implemented in hardware using specially configured circuitry and memory. Buffer A of node B might get packets from buffer A and buffer B of node A because the clock frequencies may be slightly different. Although only two buffers are shown in the depicted embodiment, the nodes have more than two buffers.

Figure 4:
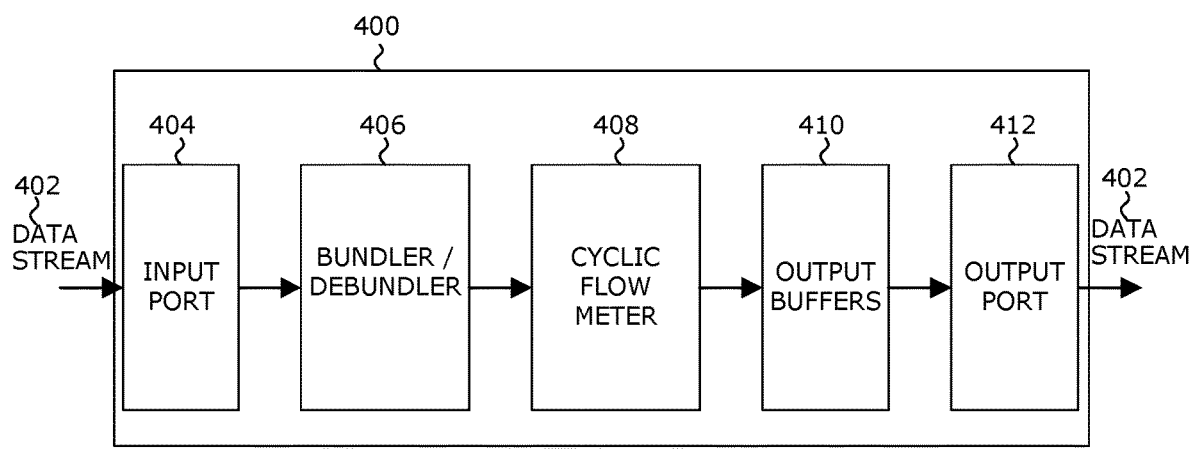
FIG. 4 is diagram illustrating the flow of a data stream through a network node according to an embodiment of the present disclosure.

FIG. 4 is a diagram illustrating the flow of a data stream through a network node 400 according to an embodiment of the present disclosure. The network node 400 reserves a set of output buffers 410 for exclusive use in buffering data streams associated with a particular class of service. In the depicted embodiment, a data stream 402 associated with the particular class of service is received at an input port 404 of the network node 400. The data stream 402 is then passed through a bundler/deblunder 406 where the data stream 402 can be unbundled from a bundle and/or bundled with other data streams (e.g., other streams received at other input ports of the network node 400). The data stream 402 is then passed through a cyclic flow meter 408. The cyclic flow meter 408 is configured to transfer packets from the data stream 402 to the output buffers 410 that are reserved for exclusive use by the class of service associated with the data stream 402. A portion of the data from output buffers (e.g., from one buffer) is transferred to an output port 412, which is then transmitted to a next hop node along a network path.

Figure 5:
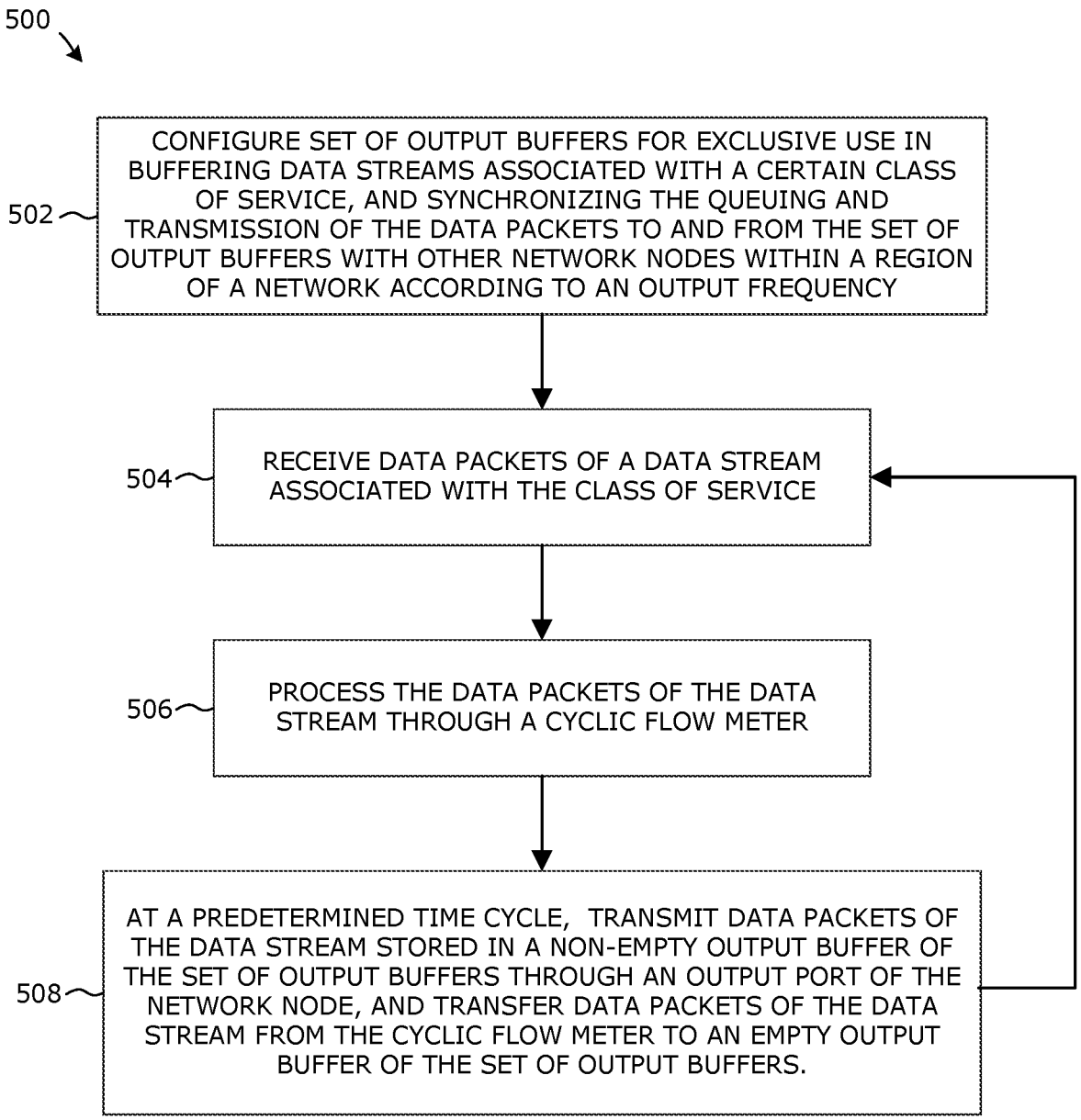
FIG. 5 is a flowchart illustrating a method for communicating packets of a data stream associated with a particular class of service in accordance with an embodiment of the present disclosure.

FIG. 5 is a flowchart illustrating a method 500 for communicating packets of a data stream associated with a particular class of service in accordance with an embodiment of the present disclosure. The method 500 can be executed by a network node such as network node 120 in FIG. 1. The method 500 begins, at step 502, by configuring a set of output buffers for exclusive use in buffering data packets of a data stream associated with a particular class of service, and synchronizing the queuing and transmission of the data packets to and from the set of output buffers with other network nodes within a region of a network according to an output frequency. The output frequency ensures that packets associated with streams of the particular class of service are not dropped and that there is a finite worst-case delivery time that is never exceeded. In an embodiment, the set of output buffers includes at least a first output buffer and second output buffer. The method 500, at step 504, includes receiving data packets of a data stream associated with the class of service.

The method 500, at step 506, includes processing the data packets of the data stream using a cyclic flow meter. The cyclic flow meter is configured to transfer a predetermined amount of data to the set of output buffers per cycle based on the output frequency to ensure that no packets are dropped due to the output buffers being full. In an embodiment, the cyclic flow meter is a paternoster shaper that implements a paternoster forwarding algorithm using one or more buffers. The cyclic flow meter is used to adjust the output frequency of data packets when the stream is received from a link that is not in the CQF region of the network node (e.g., from a network node in another CQF region or from a region that implements other queuing and scheduling algorithms besides CQF or Paternoster). For instance, a network node can store a table containing all the links within the CQF region of the network node and can determine when the data packets are received from a network node outside the CQF region. In an embodiment, the cyclic flow meter is also used to select the output buffer when a stream is unbundled from a bundle even if the stream is received from a network node within a CQF region because the unbundling process can alter the selection of the output buffer. In an embodiment, the first layer of unbundled streams of a bundle is put through a cyclic flow meter (i.e., in the case the bundle is bundles of bundles) to select an output buffer. Similarly, in an embodiment, whenever a data stream is combined into a bundle, the data stream is put through the cyclic flow meter.

At step 508, the process 500 includes transmitting, according to the output frequency, the data packets of the data stream stored in a non-empty output buffer of the set of output buffers through an output port of the network node to a next hop node along a path, while transferring data packets of the data stream from the cyclic flow meter to an empty output buffer of the set of output buffers. The method 500 repeats the steps 504 through 508 for all the data packets of the data stream.

Figure 6:
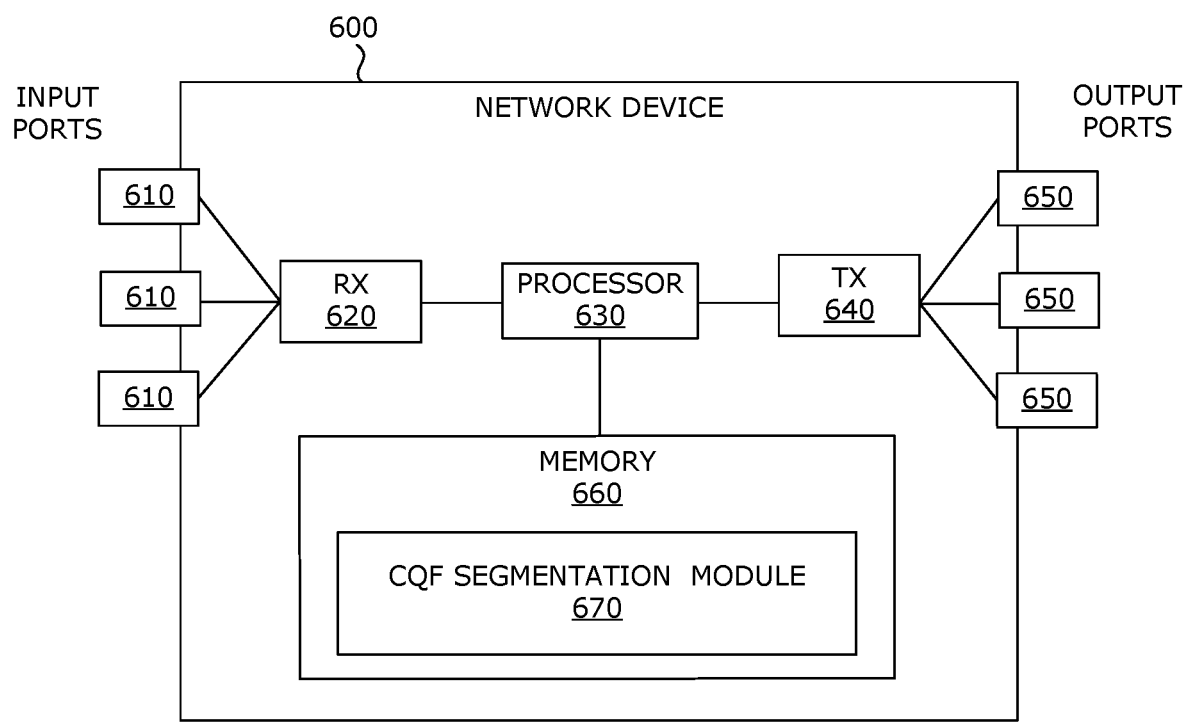
FIG. 6 is a schematic diagram illustrating a network device according to an embodiment of the present disclosure.

FIG. 6 is a schematic diagram illustrating a network device 600 according to an embodiment of the present disclosure. The network device 600 can be any type network node such as, but not limited to, a bridge, router, or label switch. In accordance with the disclosed embodiments, the network node 120 in FIG. 1 may be implemented using the network device 600. In an embodiment, the network device 600 can be used to execute the method 500 described in FIG. 5.

In the depicted embodiment, the network device 600 has one or more processors 630 or other processing means (e.g., central processing unit (CPU)) to process instructions. The one or more processors 630 may be implemented as one or more CPU chips, cores (e.g., as a multi-core processor), field-programmable gate arrays (FPGAs), application specific integrated circuits (ASICs), and digital signal processors (DSPs). The one or more processors 630 is communicatively coupled via a system bus with various components of the network device 600 including, but not limited to, receiver units (RX) 620, transmitter units (TX) 640, and memory 660. The one or more processors 630 can be configured to execute instructions stored in the memory 660. Thus, the one or more processors 630 provides a means for performing any computational, comparison, determination, initiation, configuration, or any other action corresponding to the claims when the appropriate instruction is executed by the one or more processors 630.

In an embodiment, the RX 620 or receiving means is configured to receive data via ingress ports 610. Similarly, the TX 640 or transmitting means is configured to transmit data via egress ports 650. In some embodiments, the network device 600 may connect to one or more bidirectional links. Moreover, at least one of the ingress ports 610 may be integrated with at least one of the egress ports 650. Additionally, or alternatively, at least one of the RX 620 may be replaced with at least one transceiver unit. Similarly, at least one of the TX 640 may be replaced with at least one transceiver unit. Further, at least one of the ingress ports 610 may be integrated with at least one of the egress ports 650. Additionally, or alternatively, at least one of the ingress ports 610 may be replaced with at least one bi-direction port. Similarly, at least one of the egress ports 650 may be replaced with at least one bi-directional port. Accordingly, in such embodiments, the network device 600 may be configured to transmit and receive data over one or more bidirectional links via bi-directional ports 610 and/or 650.

The memory 660 or data storing means stores instructions and various data. The memory 660 can be any type of, or combination of, memory components capable of storing data and/or instructions. For example, the memory 660 can include volatile and/or non-volatile memory such as read-only memory (ROM), random access memory (RAM), ternary content-addressable memory (TCAM), and/or static random-access memory (SRAM). The memory 660 can also include one or more disks, tape drives, and solid-state drives. In some embodiments, the memory 660 can be used as an over-flow data storage device to store programs when such programs are selected for execution, and to store instructions and data that are read during program execution. In some embodiments, the memory 660 can be memory that is integrated with the one or more processors 630.

In an embodiment, the memory 660 stores a CQF segmentation module 670. The CQF segmentation module 670 includes data and executable instructions for implementing the disclosed embodiments. For instance, the CQF segmentation module 670 can include instructions for implementing the methods described herein such as, but not limited to, the method 500 described in FIG. 5. The inclusion of the CQF segmentation module 670 substantially improves the functionality of the network device 600 by ensuring that packets associated with time sensitive streams of a particular class of service are not dropped and that there is a finite worst-case delivery time that is never exceeded while overcoming the issues related to standard queuing and transmission implementations such as CQF and Paternoster.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, various elements, steps, or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a network node for communicating time sensitive data streams in a network, the method comprising:
configuring a set of output buffers associated with an output port of the network node for exclusive use in buffering streams associated with a class of service;
synchronizing queuing and transmission of data in the set of output buffers according to an output frequency, wherein the set of output buffers of all network nodes in a region of the network is synchronized to the output frequency;
receiving data packets of a stream associated with the class of service;
processing the data packets of the stream using a cyclic flow meter, wherein the cyclic flow meter limits transfer of the data packets of the stream to the set of output buffers of the network node according to a specified amount per cycle based on the output frequency;
transmitting, according to the output frequency, the data packets of the stream from a non-empty output buffer of the set of output buffers; and
transferring, according to the specified amount per cycle, the data packets of the stream from the cyclic flow meter to an empty output buffer of the set of output buffers.

2. The method of claim 1, wherein the set of output buffers comprises a predetermined amount of buffer space to store the data packets associated with the class of service for a certain time period to ensure that no data packets associated with the class of service is dropped due to congestion.

3. The method of claim 1, wherein the class of service provides a not-to-exceed delivery time for a predetermined maximum packet size and a predetermined maximum transmission rate.

4. The method of claim 1, wherein synchronizing the queuing and transmission of data in the set of output buffers is implemented according to a cyclic queuing and forwarding (CQF) standardized algorithm, and wherein all network nodes in a region implements the CQF standardized algorithm for synchronizing the queuing and transmission of data.

5. The method of claim 1, further comprising receiving the data packets of the stream from a second network node that is external to the region of the network node.

6. The method of claim 1, further comprising unbundling a bundle comprising the stream.

7. The method of claim 1, further comprising bundling the stream with at least one other stream into a bundle.

8. The method of claim 1, wherein the cyclic flow meter is a paternoster shaper that implements a paternoster forwarding algorithm.

9. A network node comprising memory storing instructions; and one or more processors in communication with the memory, the one or more processors configured to execute the instructions to cause the network node to:
- configure a set of output buffers associated with an output port of the network node for exclusive use in buffering streams associated with a class of service;
- synchronize queuing and transmission of data in the set of output buffers according to an output frequency, wherein the set of output buffers of all network nodes in a region of the network is synchronized to the output frequency;
- receive data packets of a stream associated with the class of service;
- process the data packets of the stream using a cyclic flow meter, wherein the cyclic flow meter limits transfer of the data packets of the stream to the set of output buffers of the network node according to a specified amount per cycle based on the output frequency;
- transmit, according to the output frequency, the data packets of the stream from a non-empty output buffer of the set of output buffers; and
- transfer, according to the specified amount per cycle, the data packets of the stream from the cyclic flow meter to an empty output buffer of the set of output buffers.

10. The network node of claim 9, wherein the set of output buffers comprises a predetermined amount of buffer space to store the data packets associated with the class of service for a certain time period to ensure that no data packets associated with the class of service is dropped due to congestion.

11. The network node of claim 9, wherein the class of service provides a not-to-exceed delivery time for a predetermined maximum packet size and a predetermined maximum transmission rate.

12. The network node of claim 9, wherein synchronizing the queuing and transmission of data in the set of output buffers is implemented according to a cyclic queuing and forwarding (CQF) standardized algorithm, and wherein all network nodes in a region implements the CQF standardized algorithm for synchronizing the queuing and transmission of data.

13. The network node of claim 9, wherein the data packets of the stream are received from a second network node that is external to the region of the network node.

14. The network node of claim 9, wherein the one or more processors is further configured to execute the instructions to cause the network node to unbundle a bundle comprising the stream.

15. The network node of claim 9, wherein the one or more processors is further configured to execute the instructions to cause the network node to bundle the stream with at least one other stream into a bundle.

16. The network node of claim 9, wherein the cyclic flow meter is a paternoster shaper that implements a paternoster forwarding algorithm.

17. A computer program product comprising computer-executable instructions stored on a non-transitory computer-readable storage medium, the computer-executable instructions when executed by one or more processors of an apparatus, cause the apparatus to:
- configure a set of output buffers associated with an output port of the apparatus for exclusive use in buffering streams associated with a class of service;
- synchronize queuing and transmission of data in the set of output buffers according to an output frequency, wherein the set of output buffers of all network nodes in a region of the network is synchronized to the output frequency;
- receive data packets of a stream associated with the class of service;
- process the data packets of the stream using a cyclic flow meter, wherein the cyclic flow meter limits transfer of the data packets of the stream to the set of output buffers of the apparatus according to a specified amount per cycle based on the output frequency;
- transmit, according to the output frequency, the data packets of the stream from a non-empty output buffer of the set of output buffers; and
- transfer, according to the specified amount per cycle, the data packets of the stream from the cyclic flow meter to an empty output buffer of the set of output buffers.

18. The computer program product of claim 17, wherein the set of output buffers comprises a predetermined amount of buffer space to store the data packets associated with the class of service for a certain time period to ensure that no data packets associated with the class of service is dropped due to congestion.

19. The computer program product of claim 17, wherein the computer-executable instructions when executed by the one or more processors of the apparatus further cause the apparatus to unbundle a bundle comprising the stream.

20. The computer program product of claim 17, wherein the computer-executable instructions when executed by the one or more processors of the apparatus further cause the apparatus to bundle the stream with at least one other stream into a bundle.

* * * * *